United States Patent [19]

Freeman

[11] Patent Number: 5,638,921

[45] Date of Patent: Jun. 17, 1997

[54] DIE MOUNTED UNITIZED LUBRICANT DELIVERY APPARATUS

[75] Inventor: Lewis Gene Freeman, Kokomo, Ind.

[73] Assignee: Chrysler Corporation, Auburn Hills, Mich.

[21] Appl. No.: 567,422

[22] Filed: Dec. 5, 1995

[51] Int. Cl.$^6$ .................. F16N 1/00; B22D 17/04
[52] U.S. Cl. .................. 184/18; 184/14; 164/267
[58] Field of Search ............... 184/6, 14, 18, 184/24; 164/72, 267; 264/39, 169; 425/90, 96; 222/386

[56] References Cited

U.S. PATENT DOCUMENTS

| | | |
|---|---|---|
| 2,561,360 | 7/1951 | Goss . |
| 3,626,043 | 12/1971 | Flipot et al. . |
| 3,686,013 | 8/1972 | Williams . |
| 5,076,339 | 12/1991 | Smith . |
| 5,337,800 | 8/1994 | Cook ........................... 164/72 |

FOREIGN PATENT DOCUMENTS

| | | | |
|---|---|---|---|
| 0128159 | 5/1991 | Japan ........................... 164/72 |
| 0984658 | 1/1983 | U.S.S.R. ........................ 164/267 |
| 2116646 | 9/1983 | United Kingdom ............. 184/14 |

Primary Examiner—Thomas E. Denion
Assistant Examiner—Christopher Verdier
Attorney, Agent, or Firm—Fildes & Outland, P.C.

[57] ABSTRACT

Lubricant delivery apparatus for crushing unitized lubricant elements and delivering flowable lubricant from the crushed elements to a die casting machine die cavity. The apparatus includes a delivery cylinder on or in one die which opens with the dies for insertion of an element of flowable lubricant in a crushable container or formed as a pellet. When the dies are closed, a ram in the cylinder crushes the lubricant element against a wall on or in the other die, forcing the lubricant through a restricted passage between the dies and into the die cavity. In alternative embodiments, the delivery cylinder is disposed generally parallel with or perpendicular to the parting line of the pair of dies.

14 Claims, 9 Drawing Sheets

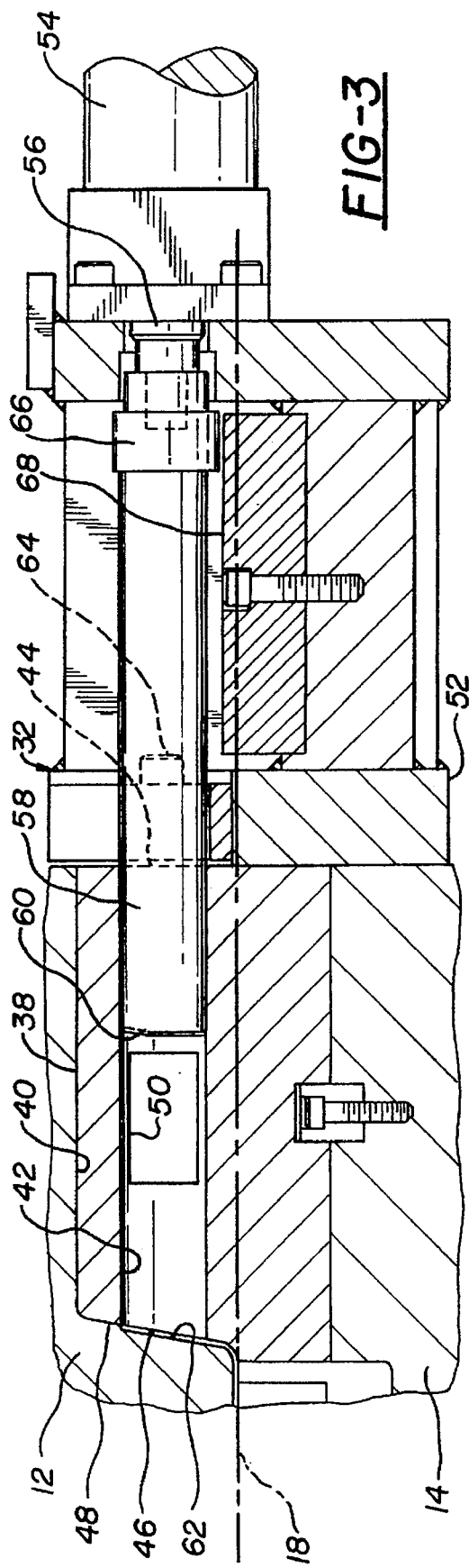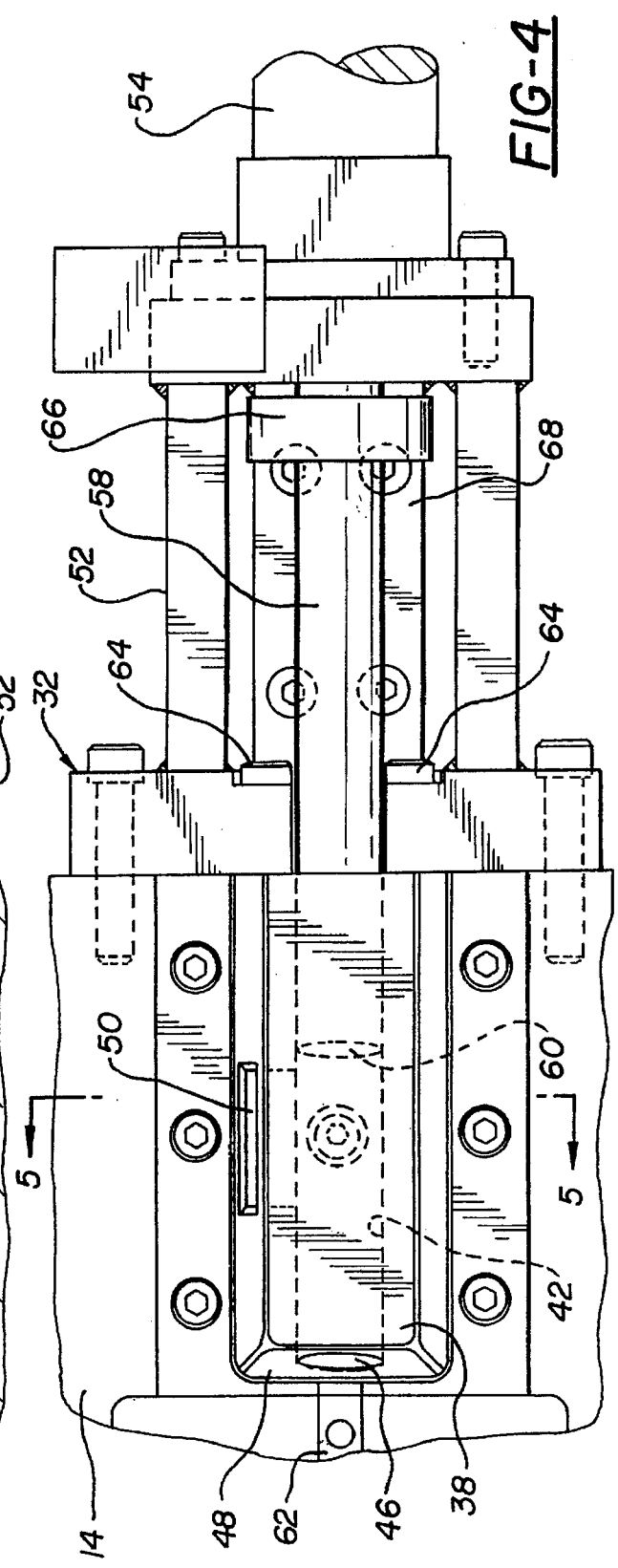

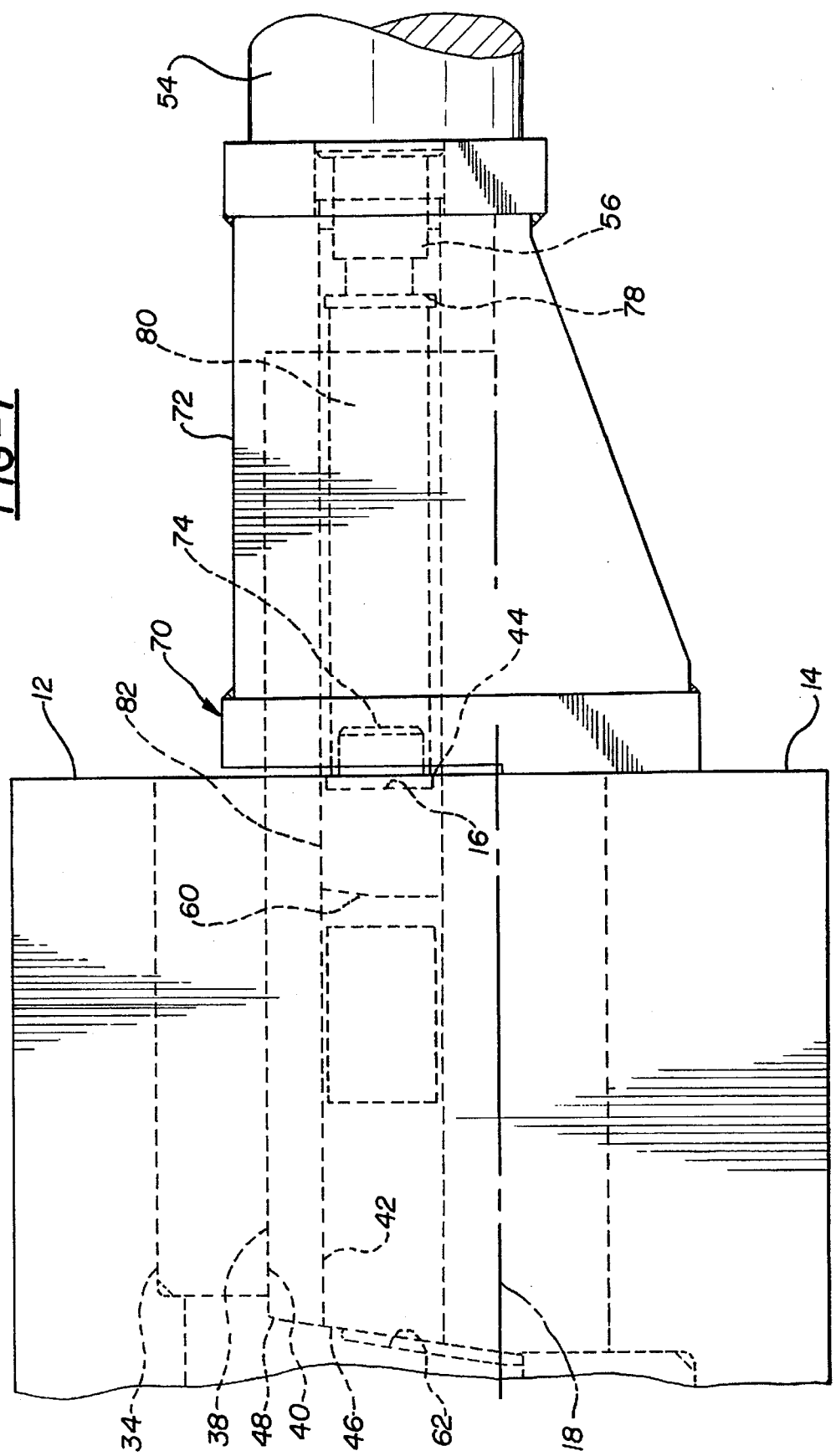

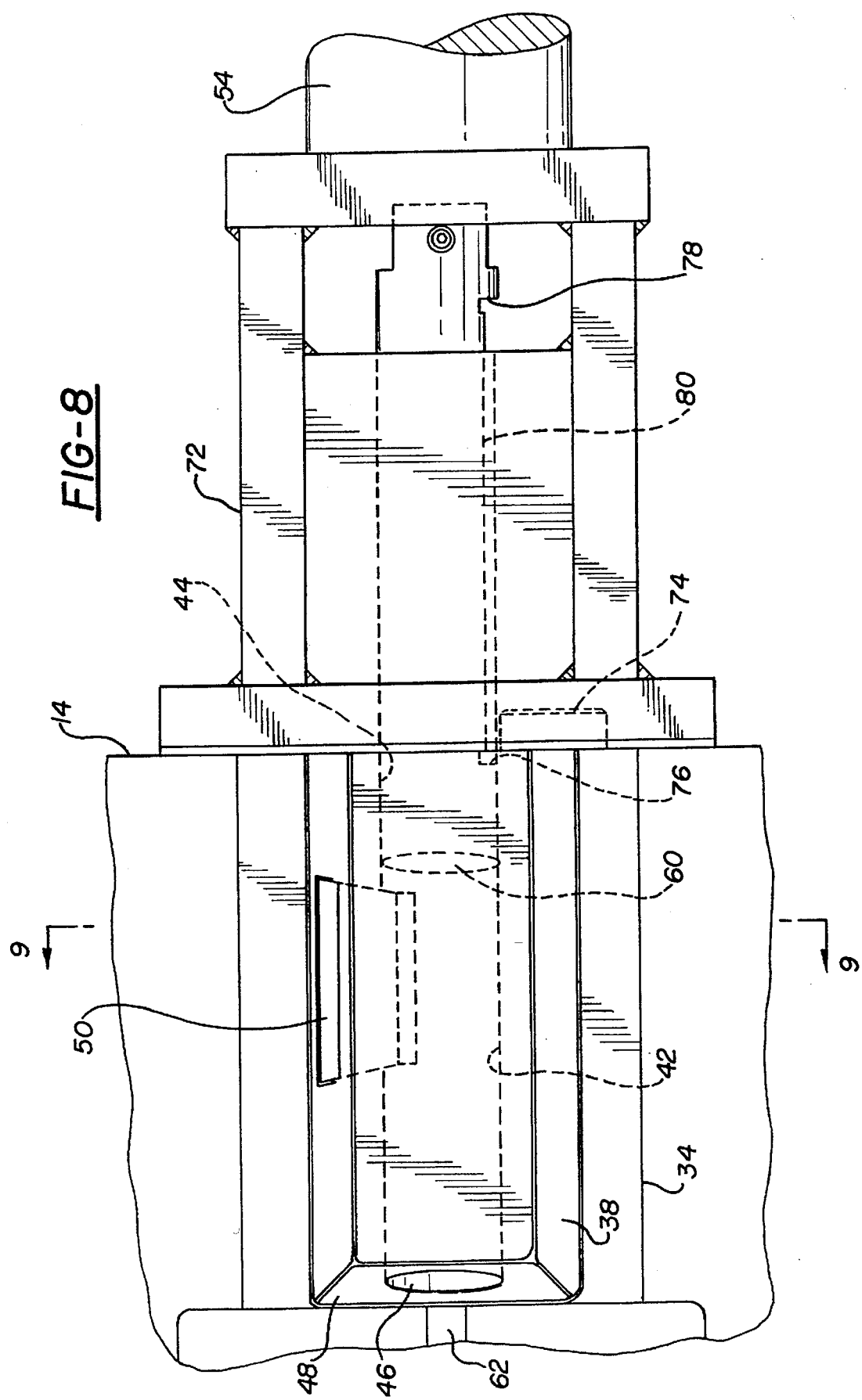

DIE MOUNTED UNITIZED LUBRICANT DELIVERY APPARATUS

FIELD OF THE INVENTION

This invention relates to the lubrication of die casting machines and more particularly to apparatus for lubricating a die cavity using a unitized or packaged lubricant.

BACKGROUND OF THE INVENTION

For many years, a primary method of applying lubricants or die release agents to the surfaces of a die casting die has been through spraying of a liquid carried lubricant onto the die cavity surfaces when the die pair is open. More recently, several forms of lubricating mechanisms or apparatus for use in conjunction with die casting machines have been proposed. These have included devices for introducing various forms of bulk lubricants into the die cavity or shot sleeve of the die casting machine as well as the application of a meltable lubricant into a shot sleeve for delivery to the die surfaces along with molten casting metal. However, suitable apparatus for providing die lubrication with a unitized, pelletized or packaged, flowable lubricant delivered to a plunger or forced into a die cavity or shot sleeve prior to metal introduction remain undisclosed.

SUMMARY OF THE INVENTION

The present invention provides apparatus for use in conjunction with die casting machines which is operative to deliver lubricants from unitized lubricant pellets or containers to the die cavity of an associated die casting machine. In certain specific embodiments, the apparatus may include a cylinder mounted in one of two dies and an opposing end wall carried by the other die. For example, the cylinder may be mounted in an insert in a movable ejector die and mate with an end wall mounted in an insert in an associated stationary cover die. The cylinder may be disposed generally horizontal and parallel with the split line of the associated die pair. An upward fill opening may be provided through which a unitized lubricant element may be inserted between the cylinder ends when the dies are open. Alternatively, a lubricant element may be inserted through an open end of the cylinder. When the dies are closed, the cylinder end is closed by a wall on the cover die except for a restricted passage which connects it with the die cavity. A ram in the cylinder is actuated by means, such as a direct connected actuating cylinder, a rack and pinion mechanism, or a cam actuator.

Unitized lubricant elements which are usable in the delivery apparatus may include packaged or containerized lubricants including flowable liquid or semi-solid (such as solid/liquid composite) lubricants sealed in a container. The container is ruptured by crushing with the ram against the closed end of the cylinder and squeezing the lubricant through the restricted passage into the die cavity. A non-containerized pellet of lubricant, which is flowable under pressure, may alternatively be used. Further details of unitized lubricant elements which can be used in die lubricating apparatus according to the invention are set forth in our copending United States patent application Ser. No. 08/567.421 filed contemporaneously with this application.

Alternative forms of unitized lubricant delivery apparatus may include arrangements wherein a cylinder is mounted on or in the movable die, for example, and disposed generally normal to the split line of the die pair. The inner end of the cylinder is closed by a wall of the stationary die, when the dies are closed, with a restricted connection to the die cavity. Opening of the dies exposes the inner end of the cylinder for insertion of a unitized lubricant and, if necessary, removal of a previously crushed lubricant container. In other ways, the structure and operation may be generally similar to the arrangements previously described.

These and other features and advantages of the invention will be more fully understood from the following description of certain exemplary embodiments of the invention taken together with the accompanying drawings.

BRIEF DESCRIPTION OF THE DRAWINGS

In the drawings:

FIG. 3 is a fragmentary cross-sectional view from the plane of the line 3—3 of FIG. 1 showing the structure of the unitized lubricant delivery apparatus mounted within the die pair;

FIG. 4 is a face view of the ejector die from the plane of the line 4—4 of FIG. 2 further illustrating the delivery apparatus;

FIG. 7 is a bottom view of a modified form of lubricant delivery apparatus mounted within a die pair;

FIG. 8 is a face view similar to FIG. 4 but showing the delivery apparatus of the embodiment of FIG. 7;

DETAILED DESCRIPTION OF THE INVENTION

Figure 1:
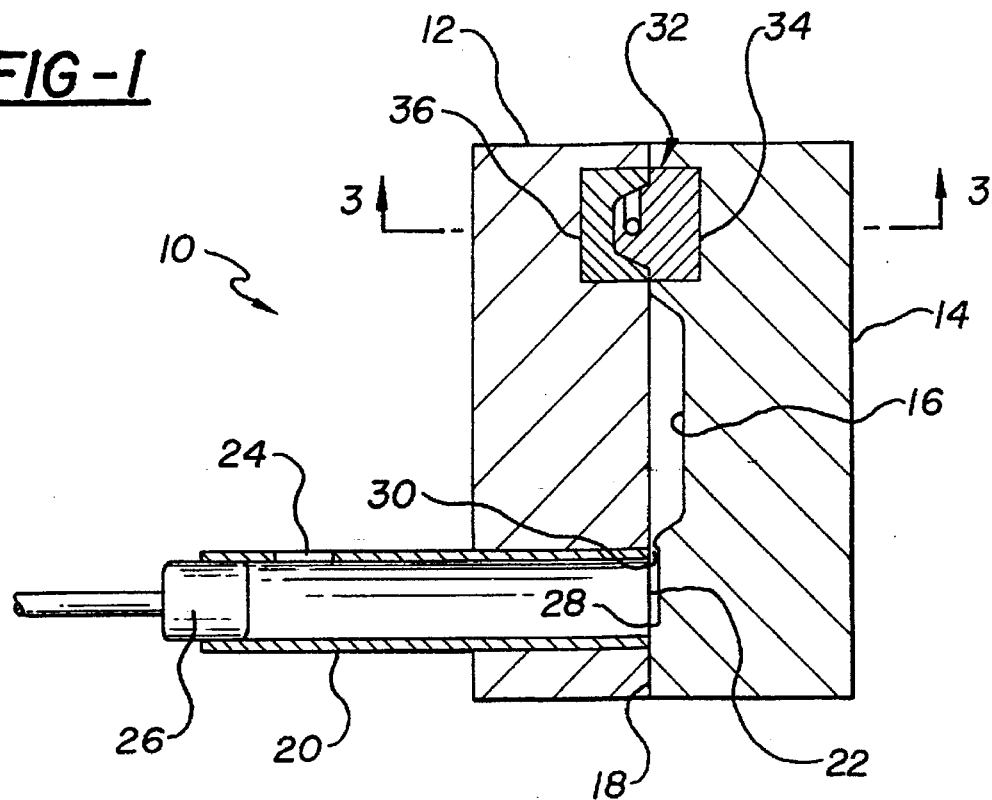
FIG. 1 is a schematic cross-sectional view of a die casting machine including one embodiment of unitized lubricant delivery apparatus according to the invention and showing the dies in the closed position

Referring first to FIGS. 1–6 of the drawings in detail, numeral 10 generally indicates a die casting machine having a stationary cover die 12 and a movable ejector die 14. When closed, the dies define an internal die cavity 16 defined by opposing walls of the dies including a recess in at least one die. The opposing die walls are separable generally along a parting line 18.

Within the stationary die 12, a shot sleeve 20 extends through to an open inner end 22 at the parting line 18. The shot sleeve extends outward of the stationary die to an opposite end near which a fill opening 24 is provided for admitting a charge of molten die casting metal during operation of the die casting machine. A plunger 26 is reciprocably movable within the shot sleeve for forcing the molten die casting metal into the die cavity 16.

When the dies are closed, as in FIG. 1, a wall 28 of the movable die closes the inner end 22 of the shot sleeve except for a runner and gate which form a restricted passage 30 connecting the interior of the shot sleeve with the die cavity 16. When the dies are opened, as shown in FIG. 2, the inner end of the shot sleeve is also opened by movement of the wall 28 away from the end 22.

In the embodiment illustrated, the conventional die casting machine so far described is modified by providing a unitized lubricant delivery apparatus 32 located within upper portions of the die pair 12, 14. Apparatus 32 includes a movable die insert 34 and a stationary die insert 36. Details of these inserts and the associated structure of the supporting dies 12, 14 and the lubricant delivery apparatus 32 are best shown in FIGS. 3–6.

The movable die insert 36 includes a protrusion 38 that extends across the main parting line 18 to mate, when the dies are closed, with a recess 40 in the stationary die insert 36. Protrusion 38 includes an internal delivery cylinder 42 having an outer end 44 opening to the exterior of the movable die and an inner end 46 opening through an inner end 48 of the protrusion 38. This end 48 of the protrusion is angled slightly to aid in opening and closing of the movable die. The cylinder 42 extends generally horizontally and parallel with the plane of the parting line 18 between the two dies 12, 14. If desired, however, the cylinder may extend in a direction other than horizontal. Preferably, the horizontally disposed cylinder 42 has an upper fill opening 50 extending upward from the cylinder through the upper wall of the protrusion 38. The opening 50 is generally rectangular and longitudinally elongated to receive a unitized lubricant element that may be generally cylindrical and elongated in the longitudinal direction of the cylinder.

Figure 2:
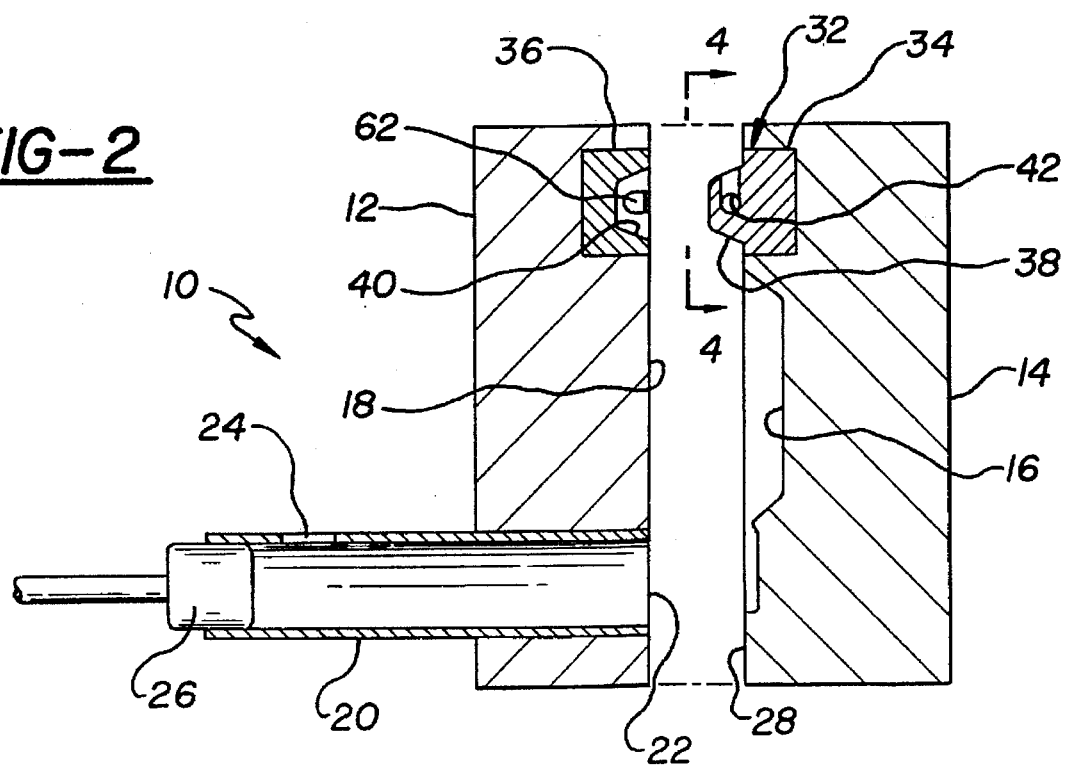
FIG. 2 is a view similar to FIG. 1 but showing the dies in an open position.
Figure 6:
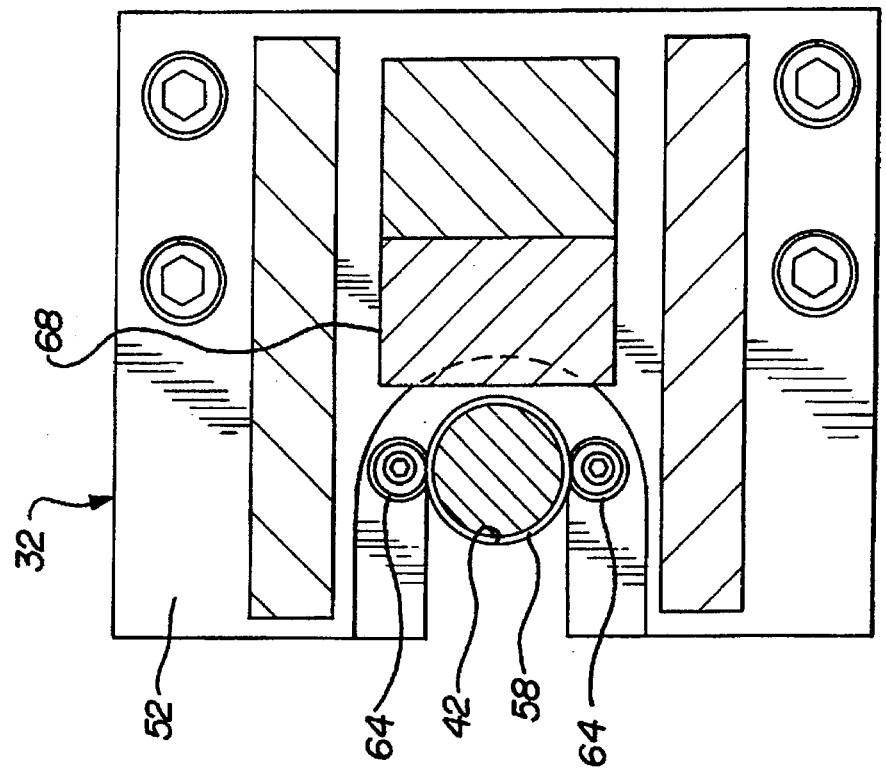
FIG. 6 is a cross-sectional view from the line 6—6 of FIG. 4.
Figure 5:
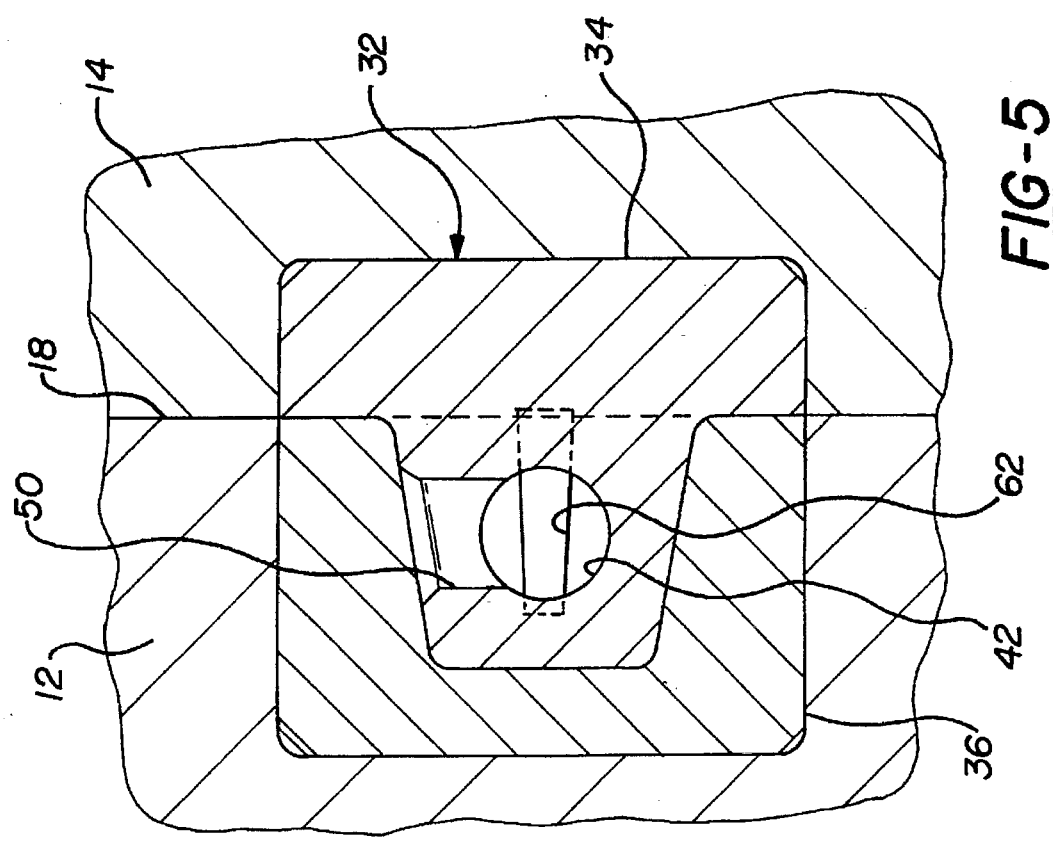
FIG. 5 is a cross-sectional view from the line 5—5 of FIG. 4.

When the dies are open, as shown in FIG. 2, the fill opening 50 is exposed for insertion of a unitized lubricant element. However, since the inner end 46 of the cylinder 42 is also open at this time, the upper fill opening 50 may be omitted, if desired, and the lubricant element may be inserted through the inner end 46 of the cylinder.

On an end of the movable ejector die adjacent the outer end 44 of the cylinder, a bracket 52 is mounted, supporting on its outer end an actuating cylinder 54 which may be of any suitable type, such as hydraulic or pneumatic. Cylinder 54 includes a rod 56 which connects with a cylindrical ram 58 that extends into and is reciprocable within the cylinder 42. In its retracted position, shown in FIGS. 3 and 4, an inner end 60 of the ram is located just outwardly of the upper fill opening 50. When the ram 58 is fully advanced by the actuating cylinder 54, the inner end 60 is aligned with or closely approaches the inner end 46 of the cylinder. The cylinder end 60 may be sloped in its upper portions to match the slope of the cylinder end while the lower portion of the ram may have a lesser slope to allow room for crushing of a lubricant container against the wall 28 of the associated cover die. A restricted passage, in the form of a groove 62, may be formed in the wall 28 of the stationary cover die, or in the adjacent portions of the movable ejector die or both, to connect the inner end 46 of the cylinder with the die cavity 16, not shown in FIGS. 3 and 4.

The forward stroke of the ram 58 is limited by stops 64 which are engaged by a rectangular head 66 formed on the outer end of the ram. The head 66 also cooperates with a guide 68 mounted in the bracket 52 to prevent rotation of the ram within the cylinder 42. The head 66 may also be used to contact limit switches or other devices for controlling actuation of the actuating cylinder 54.

The method of operation and various forms of unitized lubricant elements usable with unitized lubricant delivery apparatus, including that of the type just described, are outlined in substantial detail in our copending application Ser. No. 08/567.421 previously mentioned. In general, however, prior to the casting of metal within die casting machine 10, the dies are open and a unitized lubricant element of any suitable form is inserted into the cylinder 42 through the upper fill opening 50 or, alternatively, through the open inner end 46 of the cylinder. The dies are then closed and the actuating cylinder 54 is operated to advance the ram 58 until its inner end 60 is closely aligned with the inner end 46 of the cylinder. This crushes the unitized lubricant element, squeezing out the lubricant which is forced rapidly through the restricted passage defined by groove 62 into the die cavity 16 where it coats the inner surfaces. Then molten casting metal is poured in conventional manner through the fill opening 24 into the shot sleeve 20 and is forced by advancing the plunger 26 into the cavity 16 where it is cooled and solidified. Thereafter, the dies are again opened and the finished part is removed from cavity 16. At this time, if the unitized lubricant element was of the type enclosed within a crushable container, the crushed container is also removed from the inner end 46 of the cylinder 42, the ram 58 is retracted and the machine is then ready for insertion of another lubricant element and repetition of the process. If the machine 10 is so equipped, vacuum will be applied to the closed die cavity prior to forcing casting metal therein. The vacuum may also be applied prior to actuating the lubricant delivery apparatus in order to assist distribution of the lubricant within the die cavity and possibly into the shot sleeve.

Figure 9:
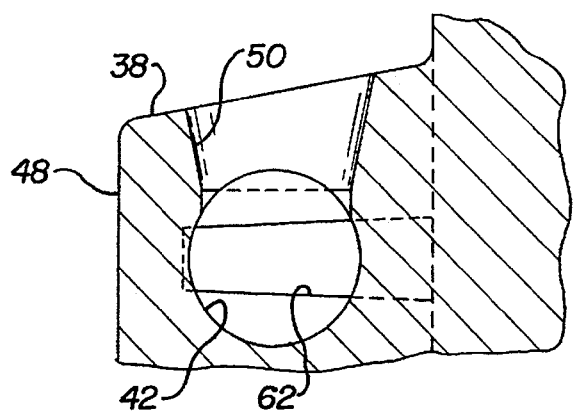
FIG. 9 is a fragmentary cross-sectional view through the cylinder fill opening from the plane of the line 9—9 of FIG. 8.

FIGS. 7–9 illustrate a slightly modified embodiment of unitized delivery apparatus 70, also installed within a die casting machine of which only portions of the stationary and movable dies 12, 14 are shown. Apparatus 70 is of larger size and intended for use with relatively larger die cavities than the embodiment previously described. But, since many of the elements are like or similar to those previously described, like numerals are used for indicating similar parts which need not further be described. The embodiment of FIGS. 7–9 differs in the form of a strengthened bracket 72 which supports the actuating cylinder 54. Also, a single stop 74 is mounted on the bracket 72 and is engaged by the ends 76, 78 of a flat 80 formed on the side of the ram 82. The flat 80 is also engaged by the stop 74 which forms a guide to prevent rotation of the ram within the cylinder 42.

It should be understood that the form of elements such as the cylinder and piston, which could be other than circular in cross section; the fill opening, which could have other than a rectangular shape; the restricted passage groove 62, which could be varied in configuration; and other related elements may be changed in shape or location without changing the essential operating method and structural relationships of the embodiments of the invention just described.

Figure 10:
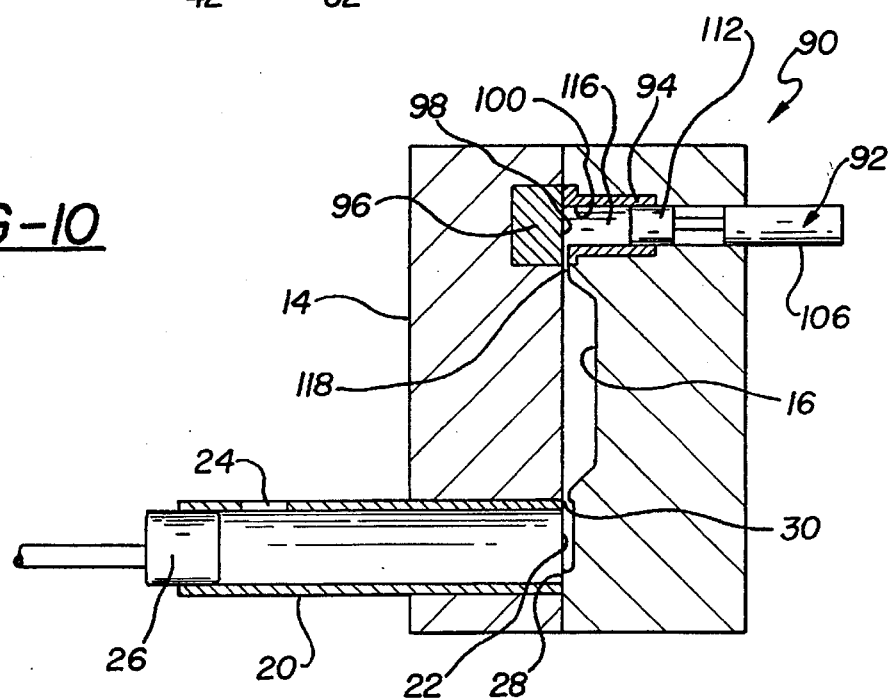
FIG. 10 is a semi-schematic cross-sectional view of a die casting machine including an alternative embodiment of unitized lubricant delivery apparatus and showing the dies in a closed position.
Figure 11:
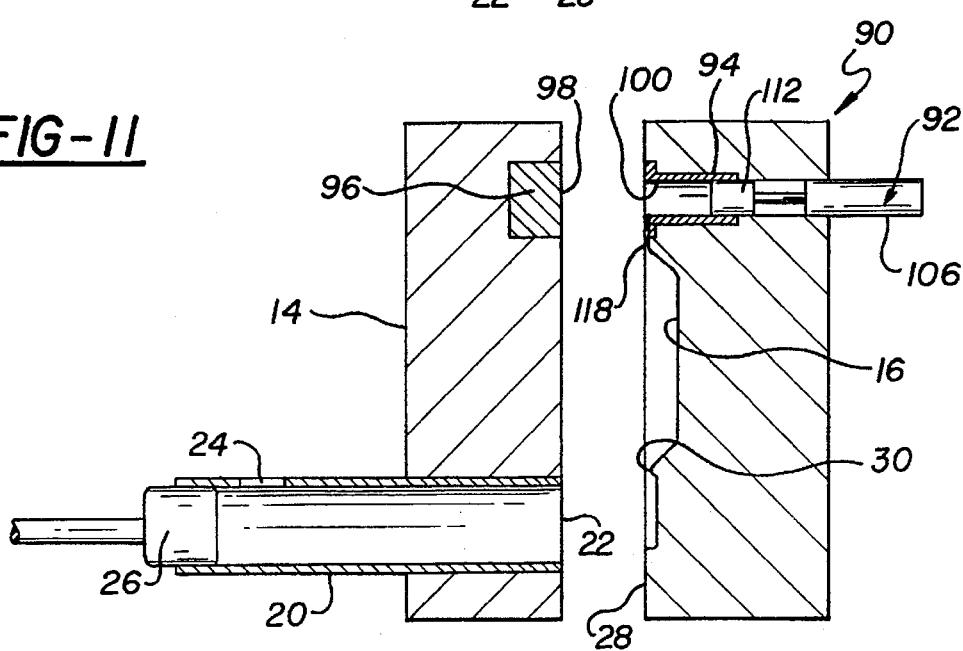
FIG. 11 is a view similar to FIG. 10 but showing the dies in an open position.
Figure 12:
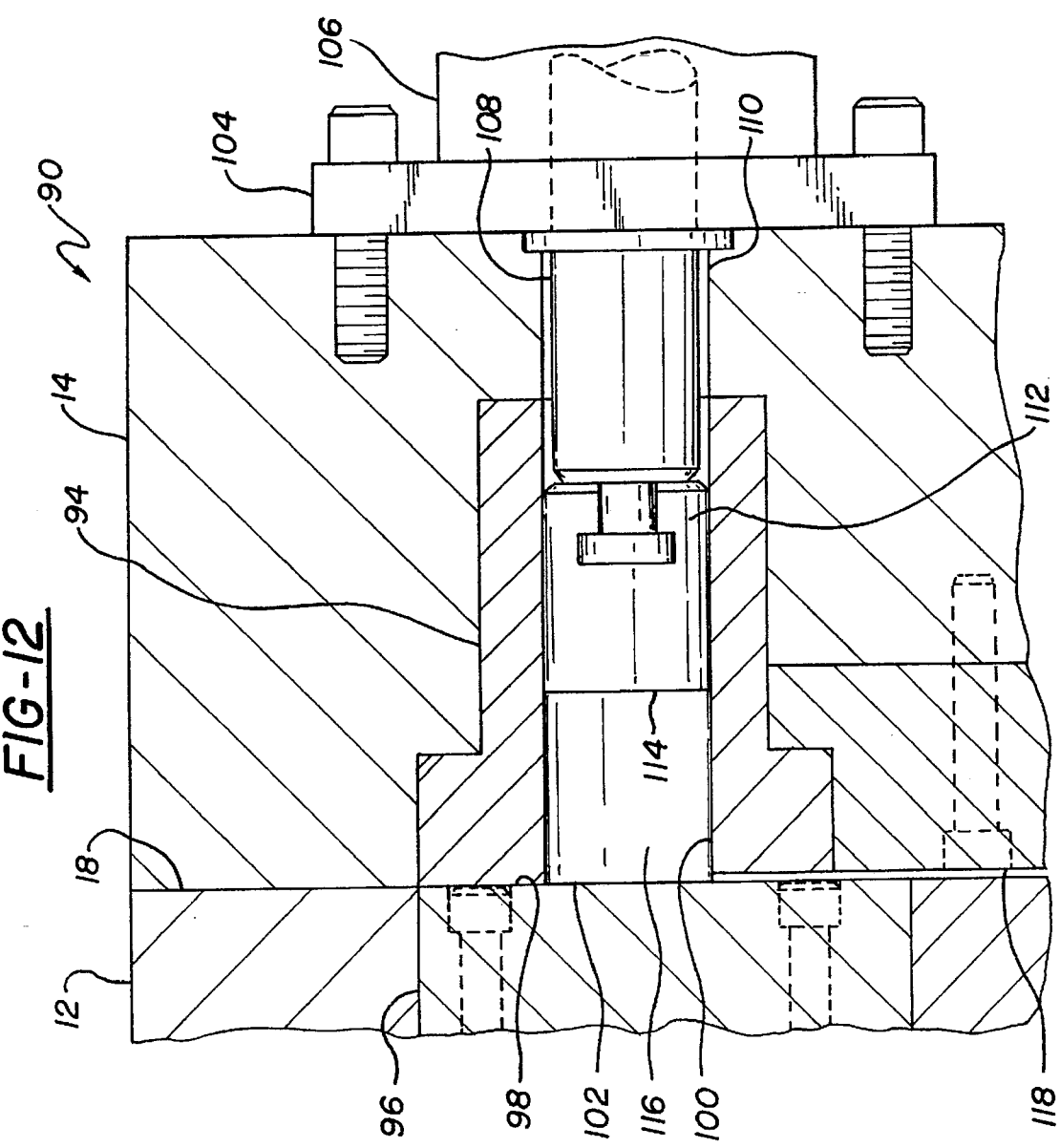
FIG. 12 is an enlarged cross-sectional view illustrating portions of the lubricant delivery apparatus shown in FIG. 10.

Referring now to FIGS. 10–12, there is shown a differing embodiment of unitized lubricant delivery apparatus integrated in a die casting machine generally indicated by numeral 90. Die casting machine 90 includes conventional elements similar to machine 10 previously described and for which identical numerals are used for like parts. Thus the machine 90 includes stationary and movable dies 12, 14 defining a die cavity 16 separated along a parting line 18. The stationary die carries a shot sleeve 20 having an inner end 22 with a fill opening 24 near an outer end and a plunger 26 reciprocably received within the sleeve 20. The shot sleeve receives molten casting metal through the fill opening 24 and the plunger 26 forces it through a restricted passage 30 formed by a runner and gate in a wall 28 of the movable die and into the die cavity 16.

Die casting machine 90 also includes unitized lubricant delivery apparatus 92. Apparatus 92 includes a movable die insert in the form of a sleeve 94 and a stationary die insert in the form of a block 96. As shown in FIG. 12, block 96 includes an end wall 98 which lies along the parting line 18 when the dies 12, 14 are closed. The sleeve 94 extends from the parting line 18 outward within the movable die 14 and internally defines a delivery cylinder 100 having an inner end 102 that opens along the parting line 18 but is closed by the end wall 98 of the stationary die insert 96 when the dies are closed.

A bracket 104 mounted on the outside of the movable die 14 supports an actuating cylinder 106 having a rod 108 that extends into the cylinder 100 through an open outer end 110 thereof and connects with a mashing member or ram 112 that is reciprocable within the cylinder.

In the retracted position of the ram 112, shown in FIGS. 10 and 12, the inner end 114 of the ram is spaced from the end wall 98 of the opposing block to form a chamber 116 into which a unitized lubricant element may be placed when the dies are open. A groove 118 formed in the face of the sleeve 94 and the associated movable die forms a restricted passage, when the dies are closed, that connects the chamber 116 with the die cavity 16.

The arrangement of cylinder 100 generally perpendicular to the parting line 18 requires slightly less alteration of the dies than does the parallel cylinder arrangement previously described. However, either arrangement may have advantages, depending upon the desired location of the actuating cylinder or other components in relation to the work space allowed for operation of the die casting machine. Further, it should be noted that, instead of being formed by inserts within the ejector and cover dies, the lubricant delivery apparatus of either embodiment could be mounted on external portions of the dies and set within separate body elements to define a chamber which is connected through a restricted passage along the die parting line to the die cavity 16.

In any of these possible arrangements, operation of the lubricant delivery apparatus is essentially the same. Referring to FIGS. 10–12, when the dies are open as shown in FIG. 11, a unitized lubricant element may be installed through the open inner end 102 of the cylinder 100 into the chamber 116 formed by the retracted ram 114. The dies are then closed and the ram 114 is advanced by the actuating cylinder 106 to crush the lubricant element against the end wall 98 of the stationary die insert 96. Lubricant from the crushed element is thereby squeezed rapidly out of the chamber and through the restricted passage or groove 118 into the die cavity 16 for coating its surfaces with lubricant. Thereafter, molten casting metal is poured into the shot sleeve 20 and is forced by the plunger 26 into the die cavity 16 through the restricted passage 30. After cooling, the dies are again opened and the finished casting is removed. If a containerized lubricant element has been used, the crushed container is then removed from the inner end 102 of the cylinder and the ram 112 is retracted so that another unitized lubricant element may be inserted into the chamber and the process repeated. If the machine 90 is so equipped, vacuum will be applied to the closed die cavity prior to forcing casting metal therein. The vacuum may also be applied prior to actuating the lubricant delivery apparatus in order to assist distribution of the lubricant within the die cavity and possibly into the shot sleeve.

Figure 13:
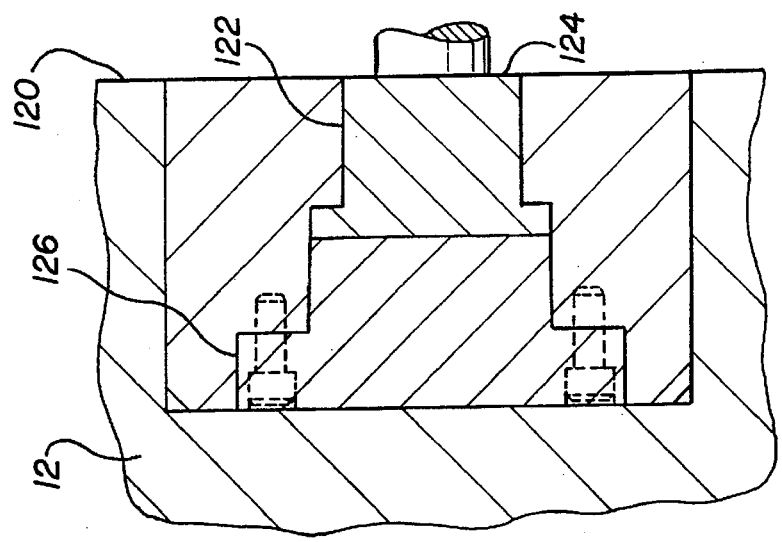
FIG. 13 is a cross-sectional view similar to the cover die portion of FIG. 12 but showing an alternative cover die insert.

Referring now to FIG. 13, there is shown an alternative stationary die insert 120 which could replace the block 96 of the FIG. 12 embodiment. Insert 120 includes a hardened plug 122, having an end face 124 that provides a long wearing surface against which the lubricant delivery elements may be crushed. The plug 122 is supported by a backing member 126 and mounted within the insert 120 from the opposite side.

FIGS. 14–17 illustrate certain alternative mechanisms or means for driving the ram of a lubricant delivery apparatus in place of the direct connected cylinders illustrated in the previously described embodiments. While the mechanisms shown are illustrated as applied to delivery apparatus having a cylinder perpendicular to the die parting line, it should be understood that these mechanisms could equally well be applied, where space permits, to parallel cylinder arrangements of the type illustrated in FIGS. 1–9 of the drawings.

Figure 15:
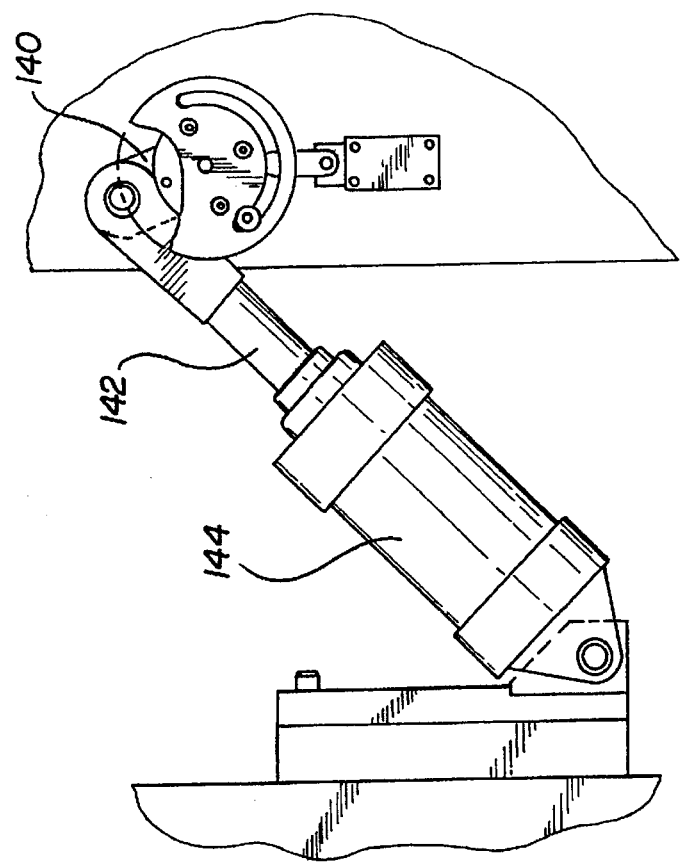
FIG. 15 is a side view showing external portions of the drive of FIG. 12 including a pivot arm arrangement for actuating the pinion.
Figure 14:
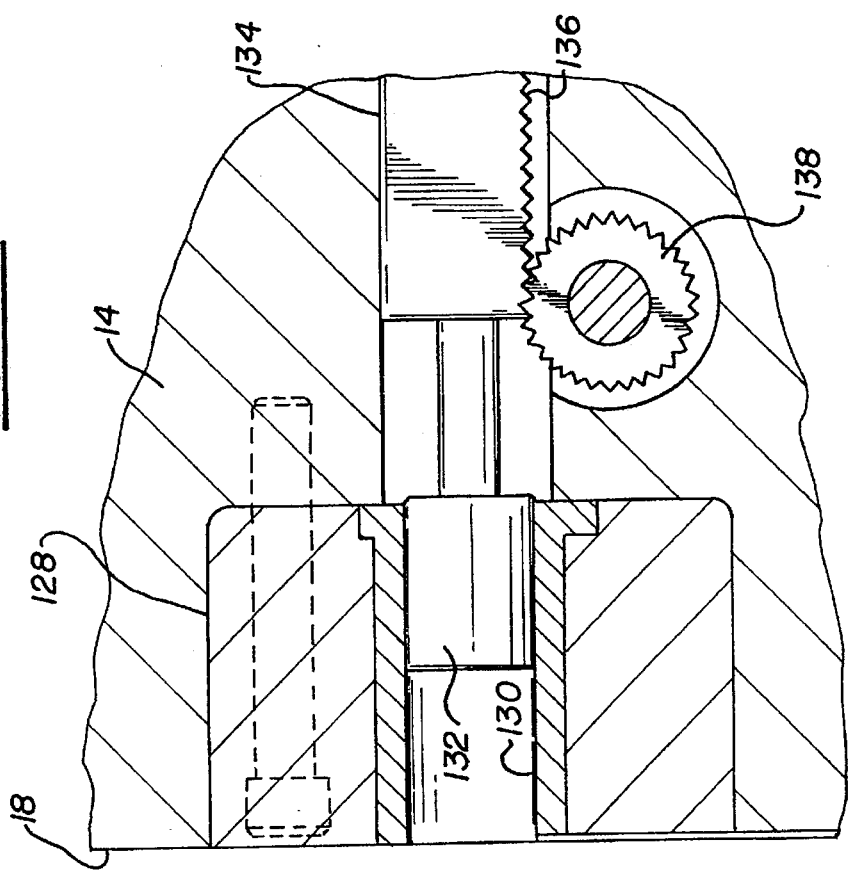
FIG. 14 is a cross-sectional view similar to FIG. 12 but showing a rack and pinion drive for the ram.

FIGS. 14 and 15 illustrate a rack and pinion drive for lubricant delivery apparatus including a stationary die insert 128 having a sleeve defined delivery cylinder 130 containing a ram 132 reciprocable in a direction perpendicular to the die parting line 18, as in the embodiment of FIG. 12. Ram 132 is connected with and actuated by a rack 134 having teeth 136 which are engaged by a pinion gear 138, all mounted in the movable die 14. The pinion gear 138 is connected externally with a lever 140, shown in FIG. 15. The lever is attached to a rod 142 of an external actuating cylinder 144 which, in operation, is operable to pivot the lever 140, rotating the pinion gear 138 and moving the rack 134 linearly to advance or retract the ram 132 in the manner previously described.

Figure 16:
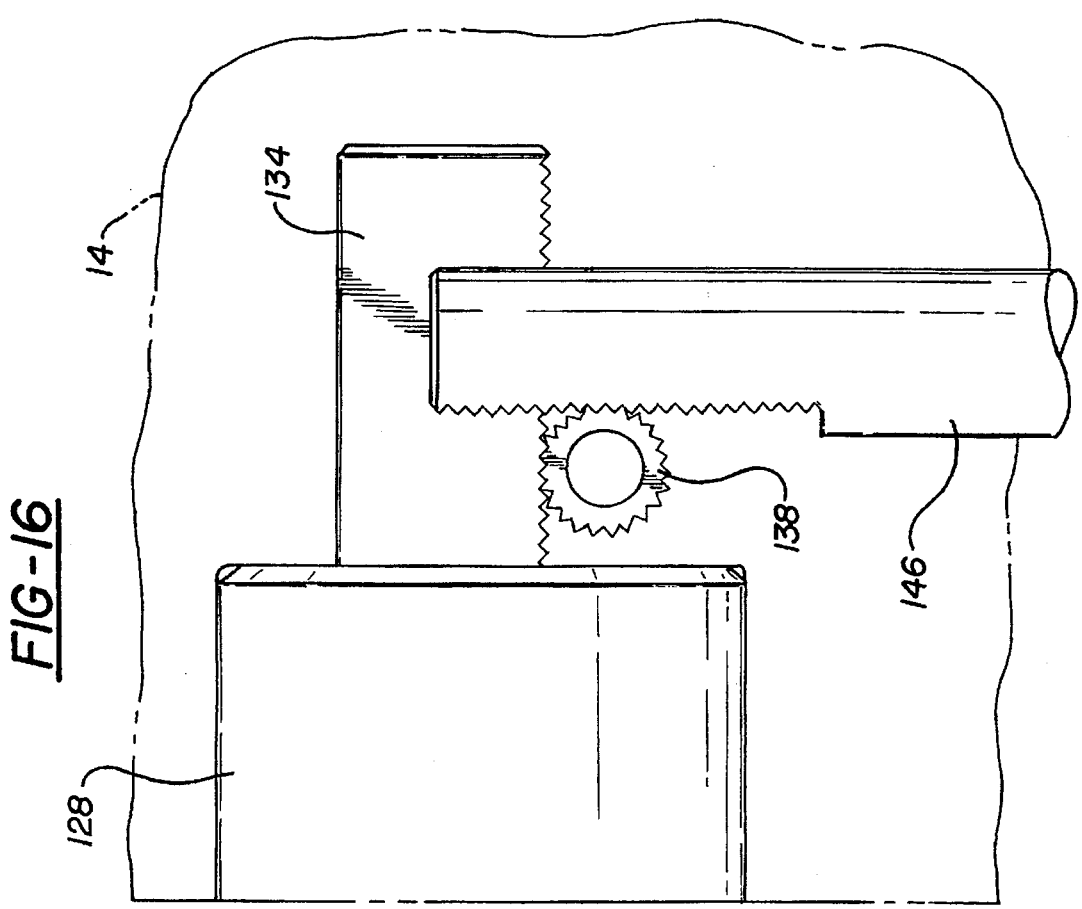
FIG. 16 is a schematic side view illustrating an alternative drive arrangement including a rack for actuating the pinion.

FIG. 16 schematically illustrates another embodiment in which the rack 134 and pinion gear 138 of FIG. 14 are alternatively driven by a second rack 146 reciprocable in the movable die and engaging the pinion 138. The second rack 146 is directly attached to an external cylinder, not shown, for reciprocating this rack.

Figure 17:
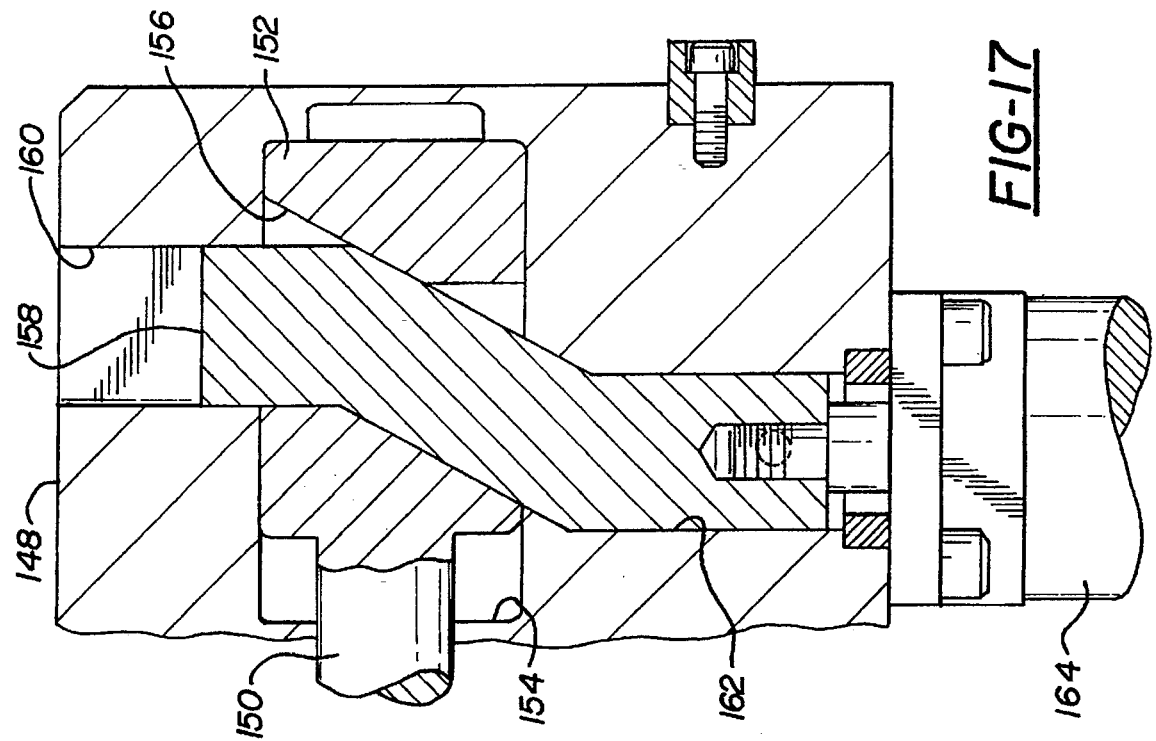
FIG. 17 is a cross-sectional view, similar to FIG. 14, but showing a cylinder driven cam arrangement for actuating the ram.

FIG. 17 illustrates still another actuating embodiment in which a multi-piece insert is provided for the movable die including a cylinder portion, not shown, and a drive portion 148. The cylinder portion includes a sleeve defined delivery cylinder, not shown, which receives a ram 150. The ram is integrally formed with a cam follower 152 that is reciprocable in a recess 154 formed in the drive portion 148. Cam follower 152 includes an angled opening 156 which is engaged by a cam 158. Cam 158 is reciprocable laterally in slots 160, 162 through the drive portion 148 and is driven by a direct connected actuating cylinder 164. Alternatively, other means of driving the cam 158 could be provided.

While the invention has been described by reference to various specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. Unitized lubricant delivery apparatus for a die casting machine having a stationary die and a movable die forming a die pair defining, when closed, a die cavity separable at a parting line between the dies, said movable die being movable toward and away from said stationary die to closed and open positions of the die pair, and injection means for delivering molten casting metal under pressure to said die cavity to form a die cast product; said apparatus characterized by:

a delivery cylinder mounted to one of said dies but separate from said injection means, said delivery cylinder having an inner end and an outer end, said inner end, in the die open position, being open for external access and, in the die closed position, facing a wall of the other of said dies and connecting with said cavity through a restricted passage between said dies;

a ram reciprocable in said cylinder between an advanced position near said cylinder inner end and a retracted position spaced outwardly away from said inner end; and means for driving said ram between said retracted and advanced positions to crush a unitized lubricant element in said cylinder against said other die wall and force said lubricant through said restricted passage into said die cavity.

2. Apparatus as in claim 1 characterized in that said delivery cylinder and said ram are of circular cross section.

3. Apparatus as in claim 1 characterized in that said delivery cylinder is formed within said movable die.

4. Apparatus as in claim 1 characterized in that said delivery cylinder is formed by an insert member.

5. Apparatus as in claim 4 characterized in that said insert member is a sleeve.

6. Apparatus as in claim 1 characterized in that said wall is formed by an insert.

7. Apparatus as in claim 1 characterized in that said ram driving means includes a direct connected actuating cylinder.

8. Apparatus as in claim 1 characterized in that said ram driving means includes a rack and pinion mechanism.

9. Apparatus as in claim 1 characterized in that said ram driving means includes a cam actuator.

10. Apparatus as in claim 1 characterized in that said ram driving means are mounted on said movable die.

11. Apparatus as in claim 1 characterized in that said delivery cylinder extends generally parallel with said die parting line.

12. Apparatus as in claim 11 characterized in that said delivery cylinder also extends in a generally horizontal direction, said cylinder having an upper fill opening between said open end and said ram retracted position for inserting said lubricant element into said cylinder.

13. Apparatus as in claim 1 characterized in that said delivery cylinder extends generally perpendicular to said die parting line.

14. Apparatus as in claim 13 characterized in that said delivery cylinder inner end extends to about the die parting line.

* * * * *

UNITED STATES PATENT AND TRADEMARK OFFICE
CERTIFICATE OF CORRECTION

PATENT NO.   : 5,638,921
DATED        : June 17, 1997
INVENTOR(S)  : Lewis Gene Freeman It is certified that error appears in the above-indentified patent and that said Letters Patent is hereby corrected as shown below:

On the title page, delete the following:
   [73] Assignee: Chrysler Corporation, Auburn Hills, Mich.

Signed and Sealed this

Twenty-eighth Day of October, 1997

Attest:

BRUCE LEHMAN

Attesting Officer

Commissioner of Patents and Trademarks